(12) United States Patent
Harris

(10) Patent No.: US 9,334,847 B2
(45) Date of Patent: May 10, 2016

(54) BI-ROTATIONAL GENERATOR

(71) Applicant: Grover Curtis Harris, Norman, OK (US)

(72) Inventor: Grover Curtis Harris, Norman, OK (US)

( * ) Notice: Subject to any disclaimer, the term of this patent is extended or adjusted under 35 U.S.C. 154(b) by 136 days.

(21) Appl. No.: 14/138,665

(22) Filed: Dec. 23, 2013

(65) Prior Publication Data

US 2015/0176560 A1 Jun. 25, 2015

(51) Int. Cl.
*F03B 13/10* (2006.01)

(52) U.S. Cl.
CPC .................... *F03B 13/105* (2013.01)

(58) Field of Classification Search
CPC ........................................ F03D 1/00
USPC ............................................ 290/54
See application file for complete search history.

(56) References Cited

U.S. PATENT DOCUMENTS

| | | | |
|---|---|---|---|
| 2,501,696 A * | 3/1950 | Souczek | 290/43 |
| 3,608,509 A | 9/1971 | Brooks et al. | |
| 3,697,765 A | 10/1972 | Carini | |
| 4,039,848 A * | 8/1977 | Winderl | 290/55 |
| 4,274,009 A * | 6/1981 | Parker, Sr. | 290/43 |
| 4,524,285 A * | 6/1985 | Rauch | 290/43 |
| 5,506,453 A * | 4/1996 | McCombs | 290/44 |
| 6,091,161 A * | 7/2000 | Dehlsen et al. | 290/43 |
| 6,278,197 B1 | 8/2001 | Appa | |
| 6,476,513 B1 * | 11/2002 | Gueorguiev | 290/55 |
| 6,531,788 B2 | 3/2003 | Robson | |
| 7,102,249 B2 * | 9/2006 | Wobben | 290/54 |
| 7,105,942 B2 | 9/2006 | Henriksen | |
| 7,199,484 B2 | 4/2007 | Brashears | |
| 7,358,623 B2 * | 4/2008 | Richards et al. | 290/55 |
| 7,527,240 B2 * | 5/2009 | Mesnier et al. | 251/143 |
| 7,541,688 B2 * | 6/2009 | Mackie | 290/54 |
| 7,679,249 B2 | 3/2010 | Appa | |
| 8,063,528 B2 | 11/2011 | Toot | |
| 8,253,294 B1 | 8/2012 | Wishart | |
| 8,288,882 B2 | 10/2012 | Bolin | |
| 8,308,422 B2 | 11/2012 | Williams | |
| 8,354,759 B2 | 1/2013 | Marchand | |
| 8,410,626 B2 | 4/2013 | Holstein et al. | |
| 8,461,711 B2 | 6/2013 | Greyshock | |

(Continued)

FOREIGN PATENT DOCUMENTS

| | | |
|---|---|---|
| CA | 655639 | 1/1963 |
| CA | 2775052 | 10/2013 |

(Continued)

OTHER PUBLICATIONS

JP2012-107535 Computer Translation.*

(Continued)

*Primary Examiner* — Joseph Waks
(74) *Attorney, Agent, or Firm* — Crowe & Dunlevy

(57) ABSTRACT

A fluid-driven electricity generator includes a stator assembly and a rotor assembly. The stator assembly includes a stator core that includes a plurality of stator windings and one or more stator turbines connected to the stator core. The one or more stator turbines are configured to rotate in a first direction. The rotor assembly includes a plurality of permanent magnets that are substantially surrounded by the stator core. The rotor assembly also includes one or more rotor turbines connected to the plurality of permanent magnets. The one or more rotor turbines are configured to rotate in a second direction that is opposite the first direction.

19 Claims, 7 Drawing Sheets

(56) References Cited

U.S. PATENT DOCUMENTS

| | | | |
|---|---|---|---|
| 8,531,072 B2 | 9/2013 | Wishart | |
| 8,531,075 B1 | 9/2013 | Moore | |
| 2002/0158472 A1 | 10/2002 | Robson | |
| 2005/0285407 A1* | 12/2005 | Davis et al. | 290/54 |
| 2006/0163963 A1 | 7/2006 | Flores | |
| 2007/0257492 A1* | 11/2007 | Robson | 290/54 |
| 2010/0129214 A1 | 5/2010 | Wilson et al. | |
| 2010/0215502 A1 | 8/2010 | Harrison | |
| 2012/0074704 A1* | 3/2012 | Rooney | 290/54 |
| 2012/0133140 A1 | 5/2012 | Cornelius et al. | |
| 2012/0267895 A1 | 10/2012 | Blaxland et al. | |
| 2013/0071244 A1 | 3/2013 | Mertens et al. | |
| 2013/0154267 A1 | 6/2013 | Healy | |
| 2014/0284932 A1* | 9/2014 | Sharkh et al. | 290/54 |
| 2015/0030430 A1* | 1/2015 | Hon et al. | 415/1 |

FOREIGN PATENT DOCUMENTS

| | | |
|---|---|---|
| EP | 2447522 | 5/2012 |
| JP | 2012107535 A * | 6/2012 |
| SU | 1787205 A3 * | 1/1993 |
| WO | 2008093037 | 8/2008 |
| WO | 2010082011 | 7/2010 |
| WO | 2010099623 | 9/2010 |

OTHER PUBLICATIONS

International Search Report and Written Opinion issued in connection with PCT Application No. PCT/US14/70200 mailed on Mar. 20, 2015.

Climescu, et al., Specific Features of a Counter-Rotating Transmission for Renewable Energy Systems; Environmental Engineering & Management Journal (EEMJ); Aug. 2011, vol. 10, Issue 8, pp. 1105-1113 (Abstract).

Popescu, et al.; Aspects Regarding the Application of Electric Generators to Wind Energy Conversion Using Counter Rotating Turbines; Advanced Topics in Electrical Engineering (ATEE) 2013 8th International Symposium (May 23-25, 2013)(Abstract).

* cited by examiner

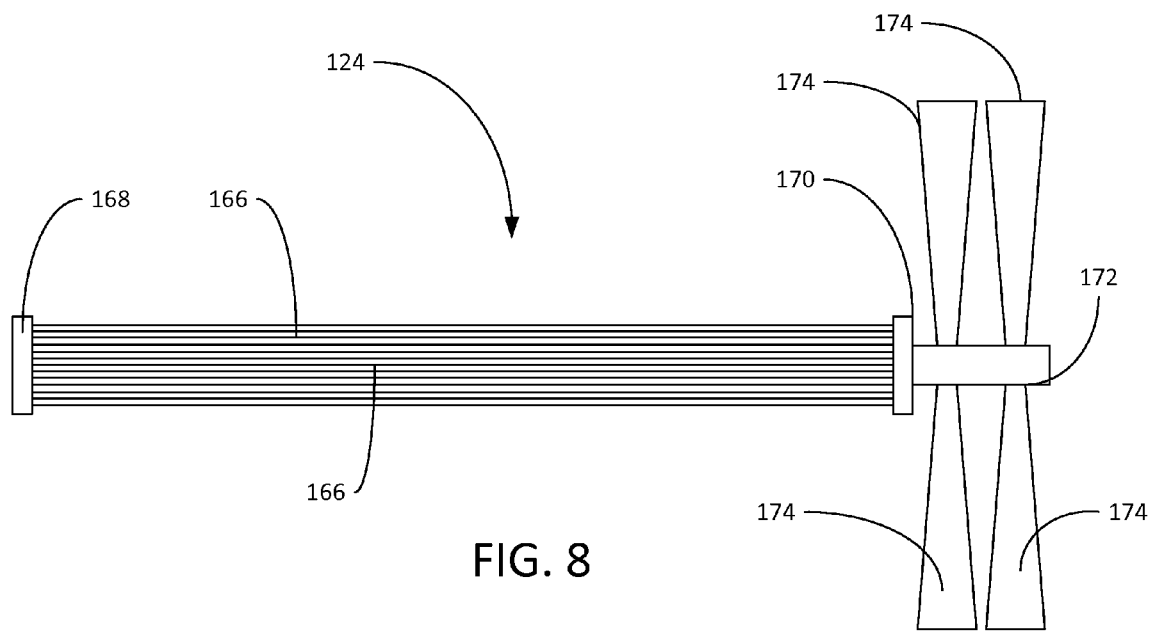
FIG. 8
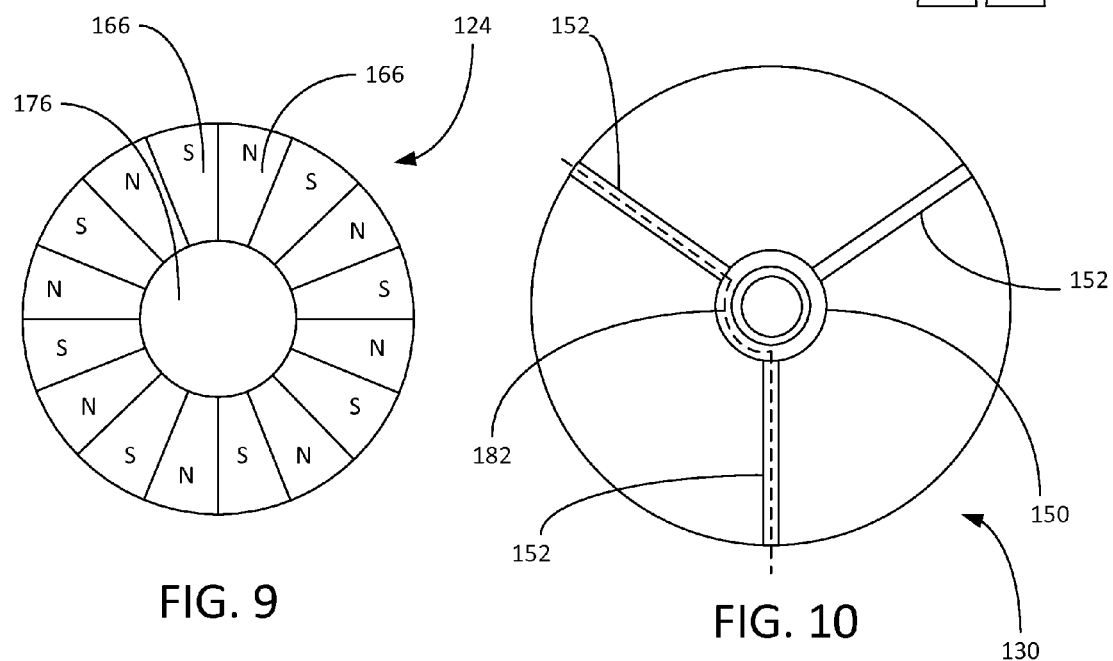
FIG. 9
FIG. 10

BI-ROTATIONAL GENERATOR

FIELD OF THE INVENTION

The present invention generally relates to an apparatus and system for generating electricity, and more particularly, to an apparatus and system for converting energy from a dynamic fluid flow into electricity.

BACKGROUND OF THE INVENTION

Electrical generators and alternators have been used for many years to produce electricity. An electric generator is a device that converts mechanical energy to electrical energy. A generator forces electric current to flow through an external circuit. The source of mechanical energy may be a reciprocating or turbine steam engine, water falling through a turbine or waterwheel, an internal combustion engine, a wind turbine, a hand crank, compressed air, or any other source of mechanical energy. Generators provide nearly all of the power for electric power grids.

Modern generators are often configured as alternators that include rotor and stator assemblies. The rotor assembly typically includes a series of permanent magnets that are together driven in a rotating manner by an external mechanical force. The stator assembly typically includes a series of windings or coils that surround the rotor assembly. The stator assembly remains stationary as the rotor assembly rotates. The movement of the permanent magnets in close proximity to the windings induces an electric current in the windings. The quantity and characteristics of the generated current are in part dependent on the configuration of the alternator (e.g., number of coils and magnets) and the speed at which the rotor assembly rotates. Rectifiers and other downstream components can be used to condition the output from the alternator.

In recent years, there have been increased efforts at establishing methods for producing electricity that are renewable and present minimal adverse impact to the natural environment. The use of wind-based generators has become particularly popular with the development of massive wind turbines. Although widely adopted, present generation systems are not well-suited for certain applications and are only moderately efficient in converting captured energy to electricity, and possess inherent limitations in their mechanical configuration. There furthermore remains a need for a generation system that provides enhanced efficiency and automated control. It is to these and other objects that the present invention is directed.

SUMMARY OF THE INVENTION

In preferred embodiments, the present invention includes a fluid-driven electricity generator that includes a stator assembly and a rotor assembly. The stator assembly includes a stator core that includes a plurality of stator windings and one or more stator turbines connected to the stator core. The one or more stator turbines are configured to rotate in a first direction. The rotor assembly includes a plurality of permanent magnets that are substantially surrounded by the stator core. The rotor assembly also includes one or more rotor turbines connected to the plurality of permanent magnets. The one or more rotor turbines are configured to rotate in a second direction that is opposite the first direction.

BRIEF DESCRIPTION OF THE DRAWINGS

FIG. 8 provides a side view of the rotor assembly.

FIG. 9 provides an end view of the rotor assembly.

FIG. 10 provides an end view of the downstream support strut.

DETAILED DESCRIPTION OF PREFERRED EMBODIMENTS

Generally, the preferred embodiments of the present invention are directed to a generator system configured to convert kinetic energy from a fluid flow into electricity. Unlike prior art systems, the generator system of the preferred embodiments includes counter-rotating rotor and stator assemblies. The use of counter-rotating rotor and stator assemblies increases the output of the generator system compared to systems in which the stator assembly remains stationary. Particularly preferred embodiments include generator systems that are optimized for use in an underwater application in which the generator systems are drive by fluid currents. Highly preferred embodiments include underwater generator systems that include positional control systems designed to optimize the position of the generator system within a fluid stream to maximize energy capture.

Figure 1:
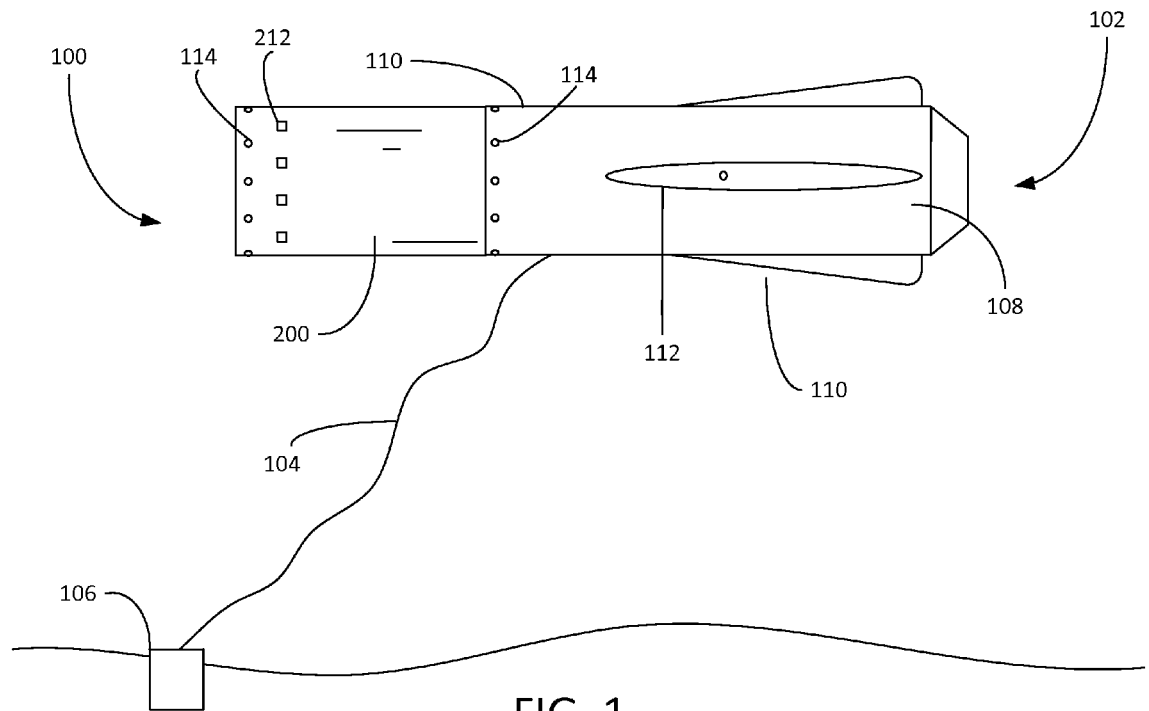
FIG. 1 provides a side view of a generator system constructed in accordance with a preferred embodiment.

Turning to FIG. 1, shown therein is a side view of a generator system 100 constructed in accordance with a preferred embodiment. Although not so limited, the generator system 100 is depicted in an underwater environment. The generator system 100 may also find utility in gaseous environments, including in the atmosphere and in gas conduits in industrial applications. For example, it may be desirable to install the generator system 100 in exhaust gas conduits to convert a portion of energy expelled from manufacturing facilities into electricity.

The generator system 100 generally includes a generator 102, an umbilical 104 and an electrical power facility 106. The electrical power facility 106 may include, for example, power lines, batteries, electric grids, motors or other loads or power transmission equipment. The umbilical 104 connects the generator 102 to the power facility 106. In particularly preferred embodiments, the umbilical 104 includes a series of wires and cables that are configured to transfer electricity and control signals to and from the generator 102. The generator 102 optionally includes a throttle control module 200 that is configured to meter the flow of fluid through the generator 102.

Figure 2:
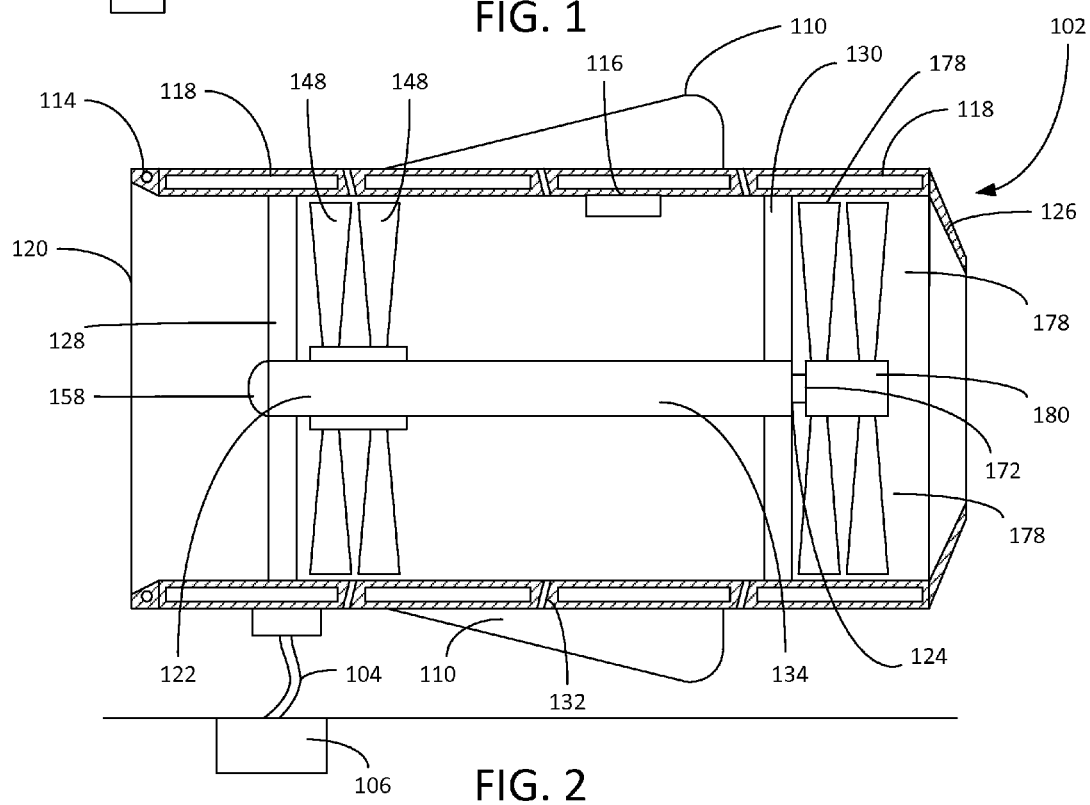
FIG. 2 provides a cross-sectional view of the generator of the generator system of FIG. 1.

Referring now also to the cross-sectional view of FIG. 2, the generator 102 includes a body 108, dorsal fins 110, lateral fins 112 and flow sensors 114. The dorsal fins 110 and lateral fins 112 are control surfaces that are connected to servo motors (not shown). In an underwater environment, the angular disposition of the dorsal fins 110 and lateral fins 112 can be adjusted to control the position of the generator 102 within the fluid stream. The dorsal fins 110 are used to control the yaw of the generator 102, while the lateral fins 112 are used to control the pitch and roll of the generator 102. The dorsal fins 110 and lateral fins 112 are preferably controlled by an onboard computer 116.

In an underwater or air/gas environment, the generator 102 can optionally be provided with buoyancy chambers 118 within the body 108. In a first preferred embodiment, the buoyancy chambers 118 are provided with a fixed volume of air, gas or fluid that is lighter than the external environmental fluid. Preferred gases include helium and helium mixtures. In a second preferred embodiment, the buoyancy chambers 118 are variable and provided with a mechanism for adjusting the buoyancy created by the chambers 118. Adjusting the amount of air within the buoyancy chambers 118 will cause the generator 102 to rise or fall in the water. A suitable variable buoyancy mechanism includes on-board pressured air and gas supplies and pressure-regulated valving to the chambers 118.

In a particularly preferred embodiment, the generator 102 includes the onboard computer 116 that automatically controls the position of the generator 102 within the fluid stream in response to readings from the flow sensors 114. The onboard computer 116 preferably includes gyroscopic azimuth, inclination and pressure sensor input. By evaluating the flow at various depths and in various directions, and the orientation and inclination of the generator 102, the onboard computer 116 can position the generator 102 at an optimized position within the fluid stream by adjusting the dorsal fins 110, lateral fins 112 and buoyancy of the generator 102. In an alternate preferred embodiment, the onboard computer 116 is located in the power facility 106 or from another remote location in wired or wireless connection with the generator 102.

Continuing with FIG. 2, the generator 102 further includes an intake 120, a stator assembly 122, a rotor assembly 124 and a discharge 126. Generally, fluid enters the generator through the intake 120, passes through the stator assembly 122, into the rotor assembly 124 and out of the generator 102 through the discharge 126. The generator further includes an upstream support strut 128, a downstream support strut 130 and a plurality of pressure ports 132. The upstream and downstream support struts 128, 130 support the stator and rotor assemblies 122, 124 within the body 108. The pressure ports 132 equalize the internal pressure of the generator 100 with the external pressure in the fluid stream. In a particularly preferred embodiment, the discharge 126 includes a taper that produces a venturi-type eduction of fluid through the generator 102.

Figure 3:
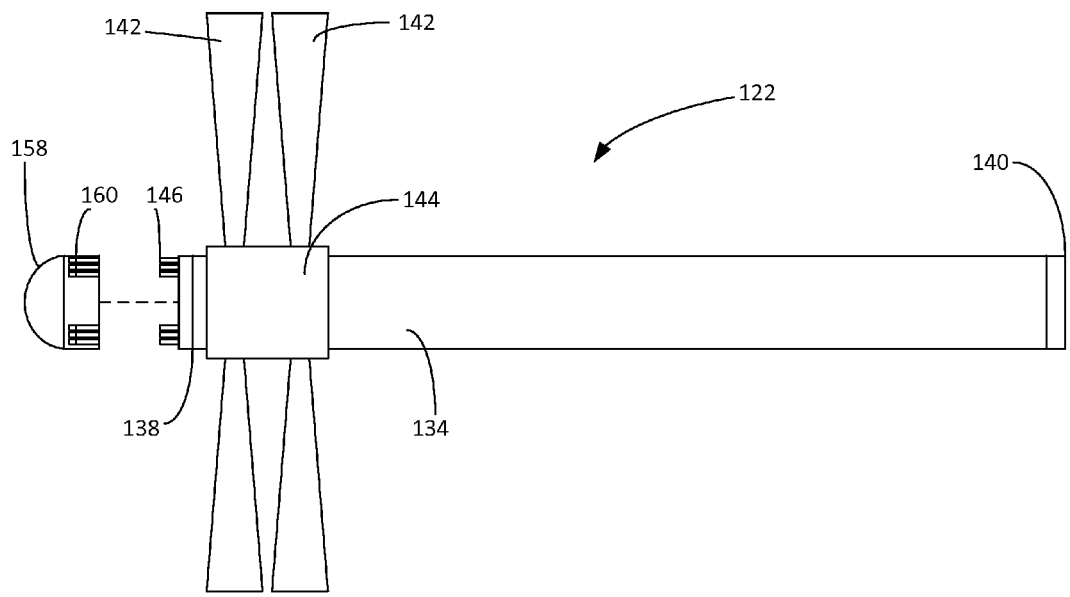
FIG. 3 provides a side view of the stator assembly and transfer hub.
Figure 4:
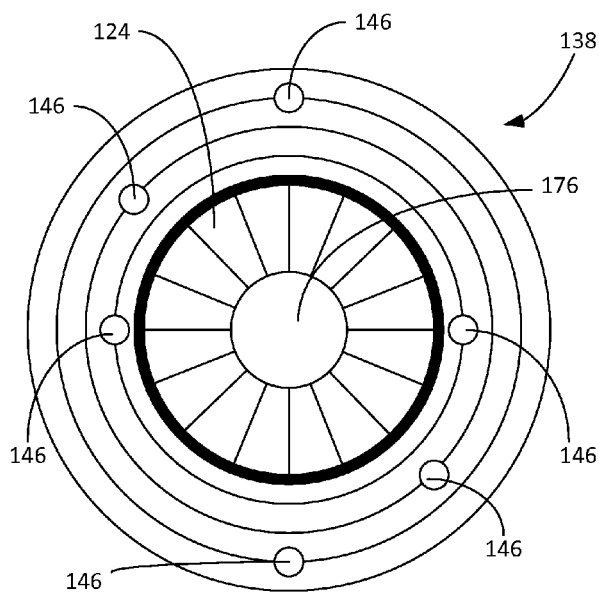
FIG. 4 provides an end view of the body of the stator assembly.
Figure 5:
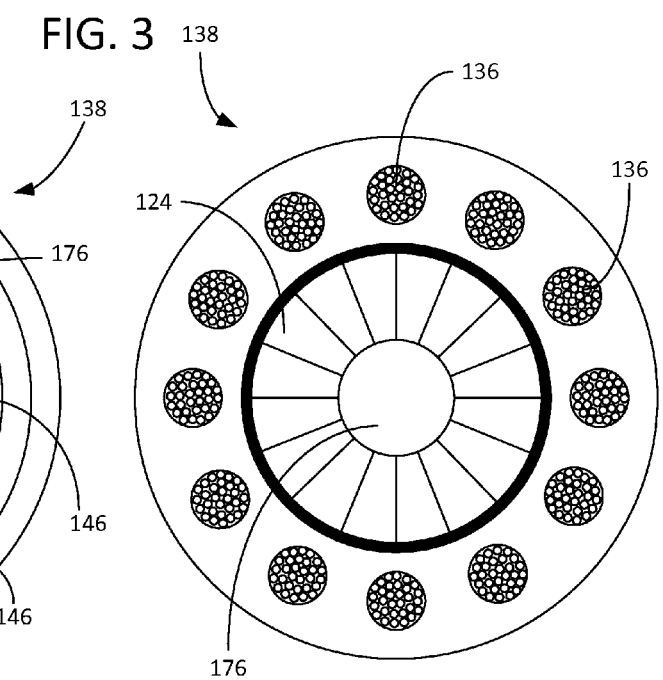
FIG. 5 provides a cross-sectional view of the body of the stator assembly.

Turning to FIGS. 3-5, shown therein are depictions of the stator assembly 122. The stator assembly 122 preferably includes a stator core 134, stator windings 136, stator upstream end cap 138, stator downstream end cap 140, stator turbines 142, and stator turbine collar 144. The stator core 134 is preferably constructed from a fluid-impermeable, electrically insulating material. Suitable materials include ceramics and certain plastics. The stator windings 136 are passed through the stator core 134 in a series of loops. In the particularly preferred embodiment depicted in FIG. 5, the stator assembly 122 includes twelve (12) sets of stator windings 136 separated into three (3) phases 136a, 136b and 136c. Each of the phases of the stator windings 136 is connected to a corresponding pair of phase lugs 146a, 146b and 146c that extend through the stator upstream end cap 138. The phase lugs 146a, 146b and 146c are used to place the stator assembly 122 in electrical communication with the downstream power facility 106.

The stator assembly 122 is configured for rotation within the body 108 of the generator 102. Rotation of the stator assembly 122 is accomplished through the use of the stator turbines 142. The stator turbines 142 are connected to the stator core 134 through the stator turbine collar 144. The turbine collar 144 offsets the loads presented by the stator turbines 142 to the stator core 134. Although two stator turbines 142 are shown in FIG. 5, it will be appreciated that greater or fewer turbines 142 may be employed as necessary.

Figure 12:
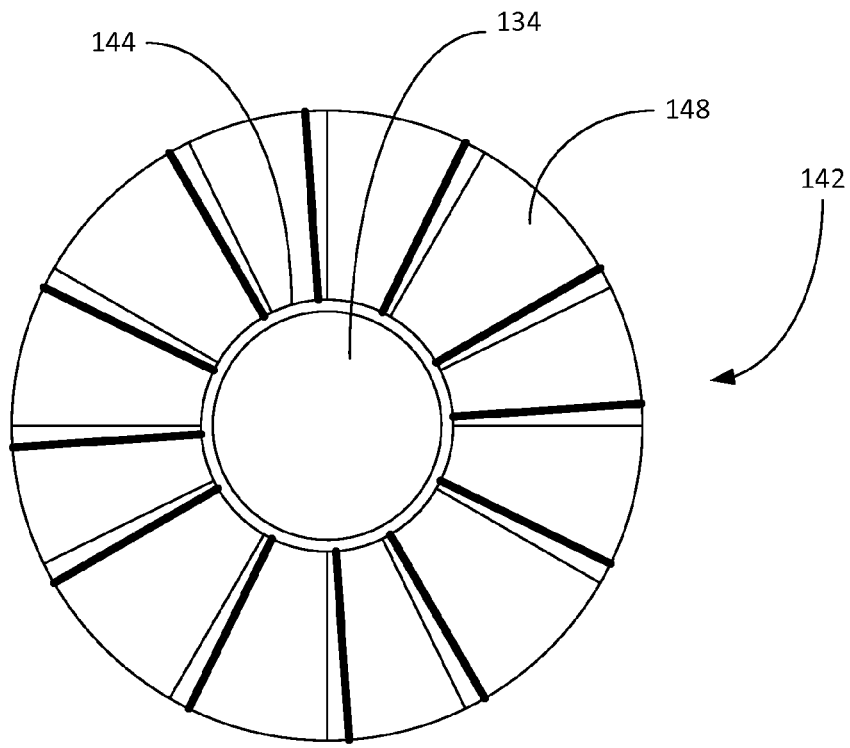
FIG. 12 provides a downstream view of a stator blade assembly.

In a particularly preferred embodiment, the stator assembly 122 includes a pair of stator turbines 142. As depicted in FIG. 12, each stator turbine 142 preferably includes eleven (11) stator turbine blades 148 that are configured to rotate the stator assembly 122 in a clockwise direction. In a highly preferred embodiment, each stator turbine 142 includes eleven (11) stator turbine blades 148 that each span approximately 27 degrees, include a 45 degree pitch and offer a 5 degree separation between adjacent blades. In the preferred embodiment depicted in FIG. 5, the stator turbines 142 are radially offset by approximately 5 degrees to improve the efficiency of the paired turbine assemblies.

Figure 6:
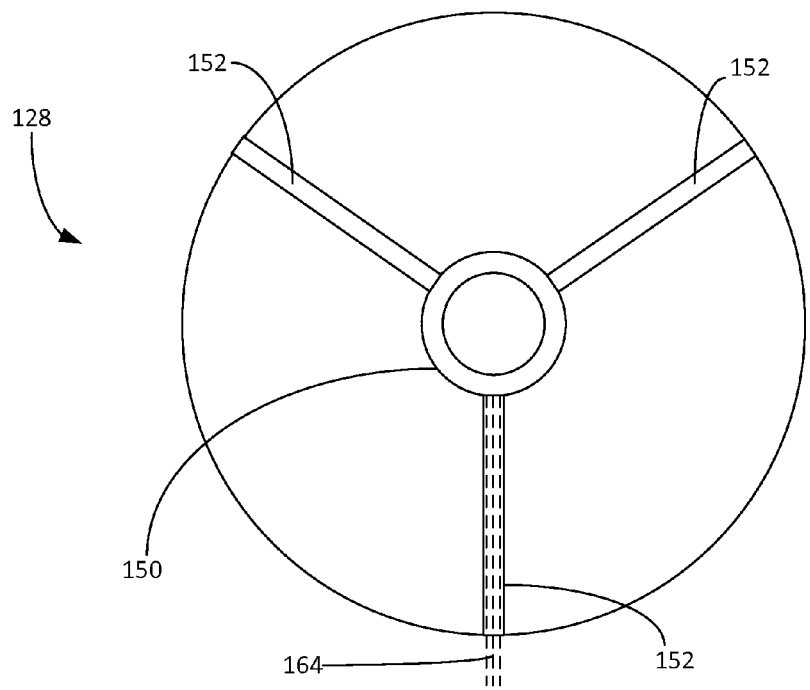
FIG. 6 provides an end view of the upstream support strut.
Figure 7:
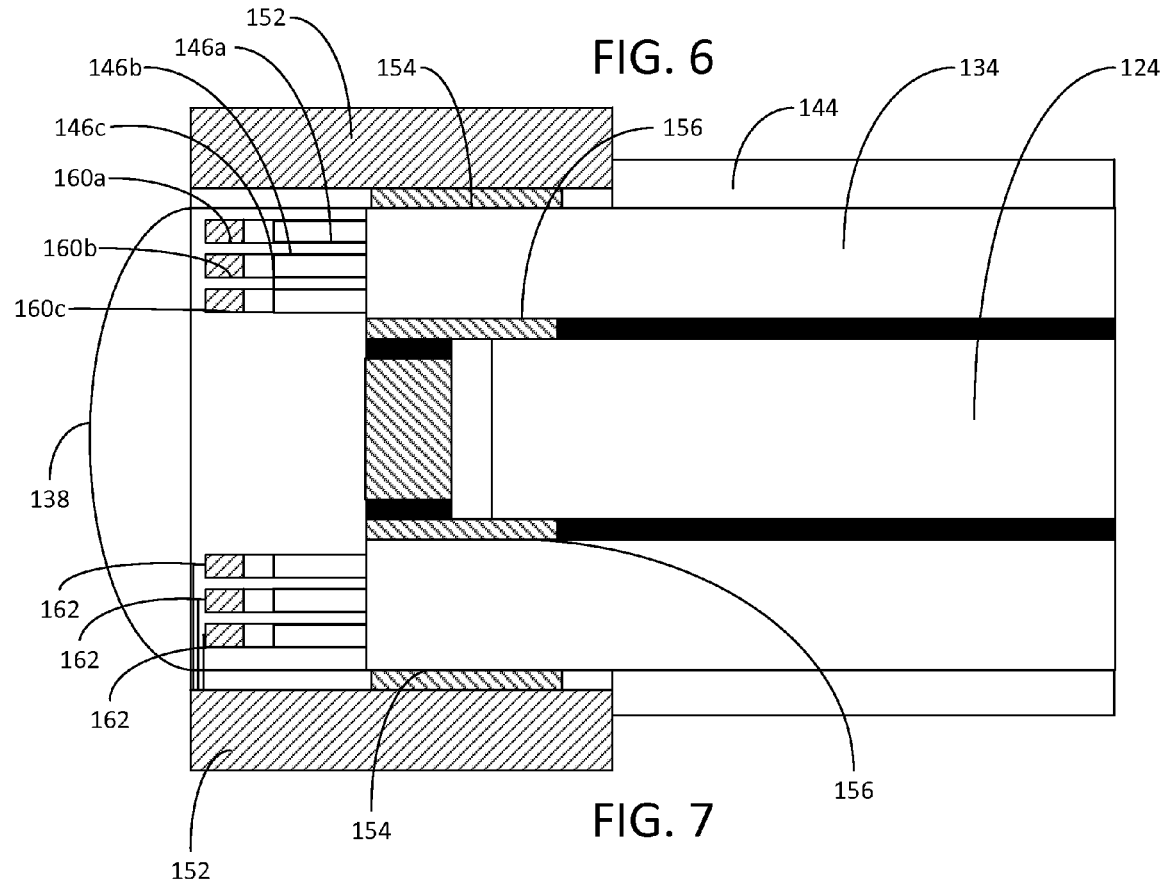
FIG. 7 provides a cross-sectional view of the upstream support strut.

Turning to FIGS. 6 and 7, shown therein are front and side cross-sectional views of the upstream support strut 128. The support strut 128 includes a central hub 150 and a plurality of braces 152 extending from the hub 150 to the body 108. The upstream support strut 128 centers the upstream ends of the rotor and stator assemblies, 124, 122 and provides a conduit for wiring from the stator assembly 122. The upstream support strut 128 includes upstream stator bearings 154 and upstream rotor bearings 156 that allow the stator assembly 122 and rotor assembly 124 to each turn independently within the upstream support strut 128. The upstream stator bearings 154 and upstream rotor bearings 156 may be include fluid-based hydrodynamic bearings or sealed ball bearings. It will be appreciated that the upstream stator bearings 154 and upstream rotor bearings 156 provide an offset to longitudinal and lateral thrusts generated by the stator and rotor assemblies, 122, 124.

Referring now also to FIG. 3, the upstream support strut 128 also includes a transfer hub 158. The transfer hub 158 is configured to remain stationary within the upstream support strut 128 and to engage the stator upstream end cap 138. As noted in FIGS. 3 and 4, the stator upstream support cap 138 includes the projecting phase lugs 146. The transfer hub 158 includes a series of transfer hub races 160 that are configured to receive the phase lugs 146 from the stator assembly 122. Each of the transfer hub races 160 includes an electrically conductive socket 162 that is connected to a transfer cable 164. The transfer cable 164 is routed through on or more of the braces 152 of the upstream support strut 128 and conducts electricity away from the stator assembly 122 to the umbilical 104.

Each of the transfer hub races 160 is concentrically located inside the transfer hub 158 to correspond to the radial position of the corresponding phase lugs 146. For example, phase lugs 146a, which correspond to stator winding 136a, are placed on an exterior portion of the stator upstream end cap 138 and correspond to an exterior transfer hub race 160*a*. Similarly, phase lugs 146*b*, 146*c* are configured to engage transfer hub races 160*b*, 160*c*, respectively. The phase lugs 146 may optionally include spring-loaded brushes to ensure consistent electrical contact between the phase lugs 146 and the conductive sockets 162 of the transfer hub 158.

Turning to FIGS. 8-9, shown therein are side and upstream ends, respectively, of the rotor assembly 124. The rotor assembly 124 includes a series of longitudinally-extending permanent magnets 166, a rotor upstream end cap 168, a rotor downstream end cap 170, a turbine shaft 172 and one or more rotor turbines 174. The magnets 166 are preferably arranged in alternating order of North-South poles (as indicated in FIG. 9). In a particularly preferred embodiment, the magnets 166 are N54 neodymium bar magnets with longitudinal polarity. Each of the magnets 166 is preferably attached to a rotor shaft 176, which is constructed from a magnetically conductive material. In highly preferred embodiments, each of the permanent magnets 166 extends around the rotor shaft 176 for 22.5 degrees.

The rotor assembly 124 is configured for rotation within the center of the stator assembly 122. Rotation of the rotor assembly 124 is accomplished through the use of the rotor turbines 174. The rotor turbines 174 are connected to the turbine shaft 172, which is in turn connected to the rotor shaft 176. Although two rotor turbines 174 are shown in FIG. 8, it will be appreciated that greater or fewer turbines 174 may be employed as necessary.

Figure 11:
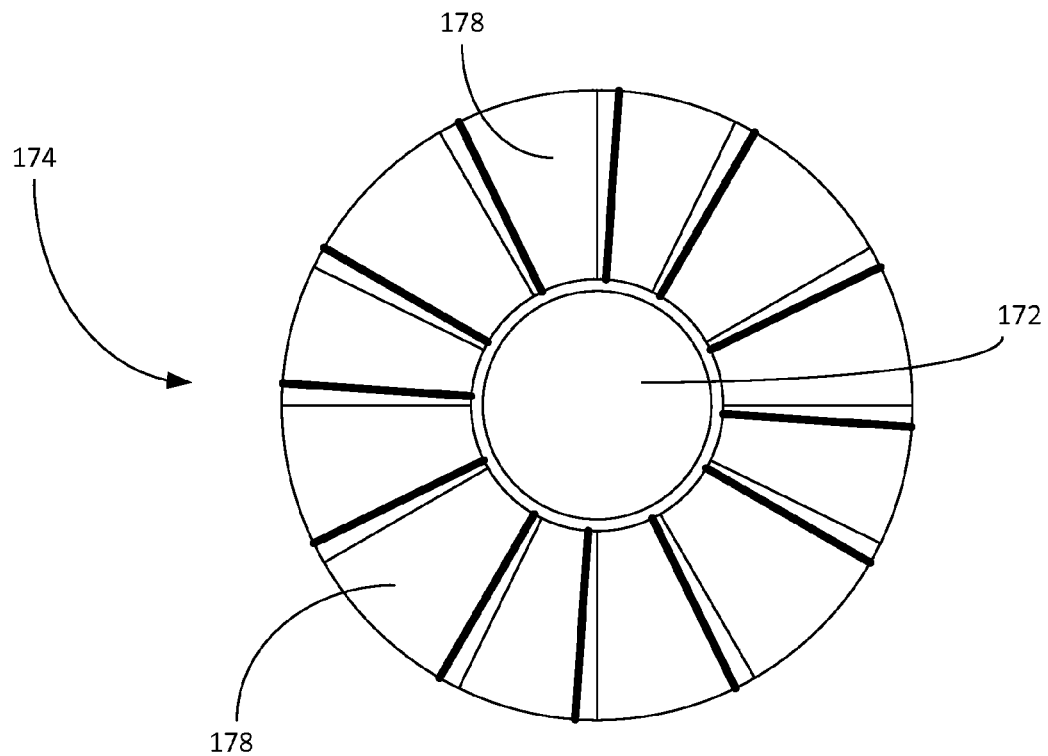
FIG. 11 provides a downstream view of a rotor blade assembly.

In a particularly preferred embodiment, the rotor assembly 124 includes a pair of rotor turbines 174. As depicted in FIG. 11, each rotor turbine 174 preferably includes eleven (11) rotor turbine blades 178 that are configured to rotate the rotor assembly 124 in a counter-clockwise direction. In a highly preferred embodiment, each rotor turbine 174 includes eleven (11) rotor turbine blades 178 that each span approximately 27 degrees, include a 45 degree pitch and offer a 5 degree separation between adjacent blades. In the preferred embodiment depicted in FIG. 8, the rotor turbines 174 are radially offset by approximately 5 degrees to improve the efficiency of the paired turbine assemblies. As noted in FIG. 2, the rotor assembly 124 may optionally include a rotor turbine collar 180 to secure the rotor turbine blades 178 to the turbine shaft 172. It will be appreciated that the counter-rotation of the stator turbines 142 and rotor turbines 174 significantly reduces or eliminates torsional forces generated by the rotating components within the generator 102, which permits the use of a flexible umbilical 104.

Turning to FIG. 10, shown therein is the downstream support strut 130. The downstream support strut 130 is designed to center the stator and rotor assemblies, 122, 124 within the body 108. The downstream support strut 130 preferably includes a central hub 150 and braces 152. The downstream support strut 130 may optionally include a series of thrust bearings as illustrated and described in connection with the upstream support strut 128.

In addition to the load resistive and centering functions, the downstream support strut 130 may also be used to provide a path for electrical connections extending across the body 108 of the generator 100. For example, it may be advantageous to provide the downstream support strut 130 with a guidance control cable 182 that provides signals from the flow sensors 114 distributed around the generator 100 to the onboard computer 116.

Figure 13:
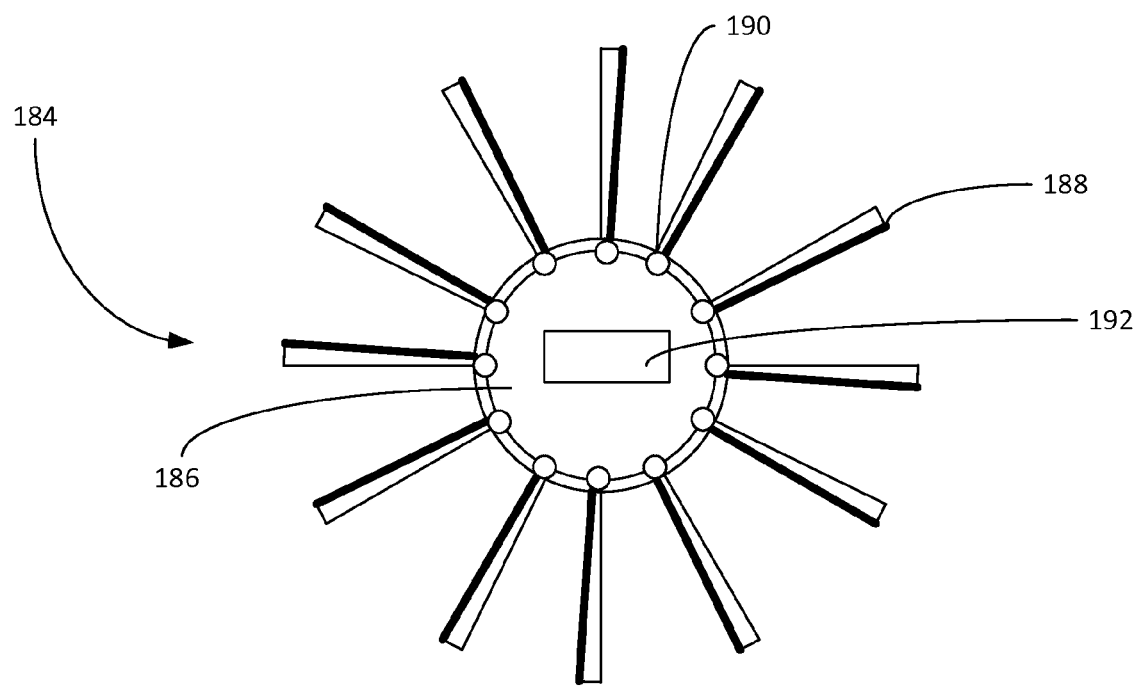
FIG. 13 provides a downstream view of a variable pitch blade assembly in a first position.
Figure 14:
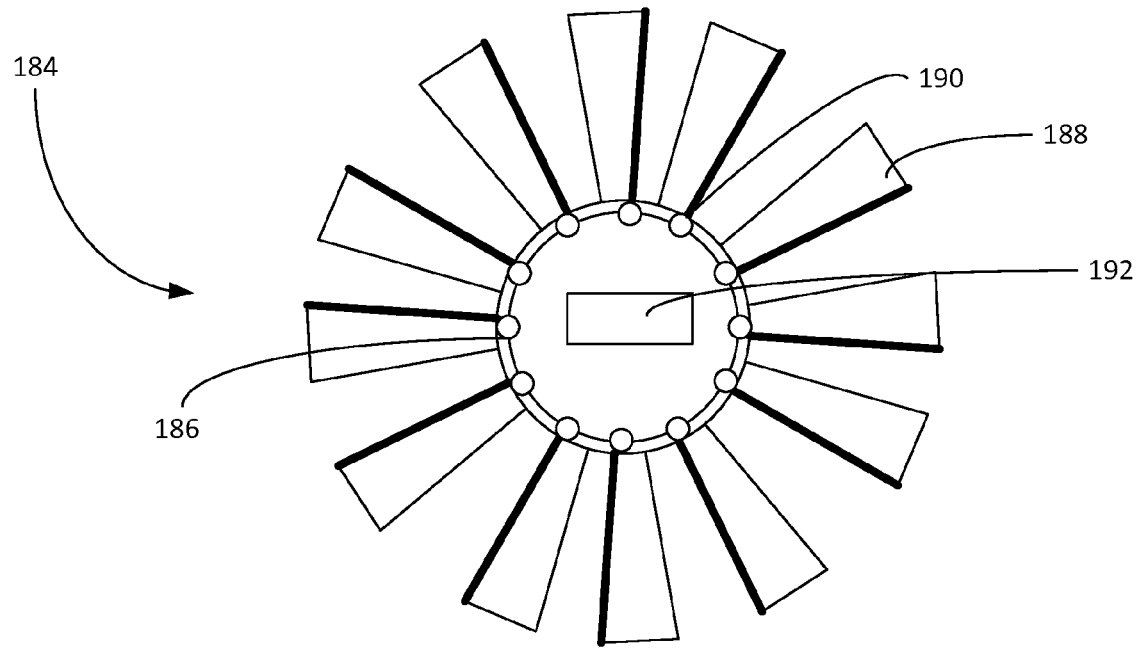
FIG. 14 provides a downstream view of a variable pitch blade assembly in a second position.

Turning to FIGS. 13 and 14, shown therein is an alternate preferred embodiment in which the rotor and stator turbines 174, 142 are provided as variable-pitch turbines 184. The use of variable-pitch turbines provides the ability to precisely control the rotational speed of the rotor and stator assemblies 124, 122. It will be understood that the depiction of the variable-pitch turbines 184 in FIGS. 13 and 14 is merely exemplary and that the variable pitch turbines 184 are configured to rotate in opposite directions when used as the stator turbines 142 and rotor turbines 174.

Each variable-pitch turbine 184 includes a variable-pitch hub 186 and a plurality of variable-pitch vanes 188. Each of the plurality of variable-pitch vanes 188 is connected to the variable-pitch hub 186 with a pivot 190 to enable each of the variable-pitch vanes 188 to rotate on an axis perpendicular to the rotational axis of the variable-pitch turbine 184. In FIG. 13, each of the variable-pitch vanes 188 has been rotated to a "low-profile" position that is well-suited for high-speed, low-torque situations. In contrast, FIG. 14 presents the variable-pitch vanes 188 in a higher-profile position in which the variable-pitch turbine 184 will produce increased torque at lower rotational speeds.

The rotational position of each of the variable-pitch vanes 188 is controlled with servo motors 190 and a power source 192. In a particularly preferred embodiment, the servo motors 190 are two-way hydraulic motors and the power source 192 provides a switchable source of hydraulic pressure to the servo motors 190. By adjusting the pressure and direction of fluid flow from the power source 192, the direction and extent of rotation of each of the variable-pitch vanes 188 can be controlled. Alternatively, the servo motors 190 can be electric and the power source 192 a source of electric current. In highly preferred embodiments, the onboard computer 116 controls the variable pitch turbines 184 to optimize the performance of the generator 102.

Figure 15:
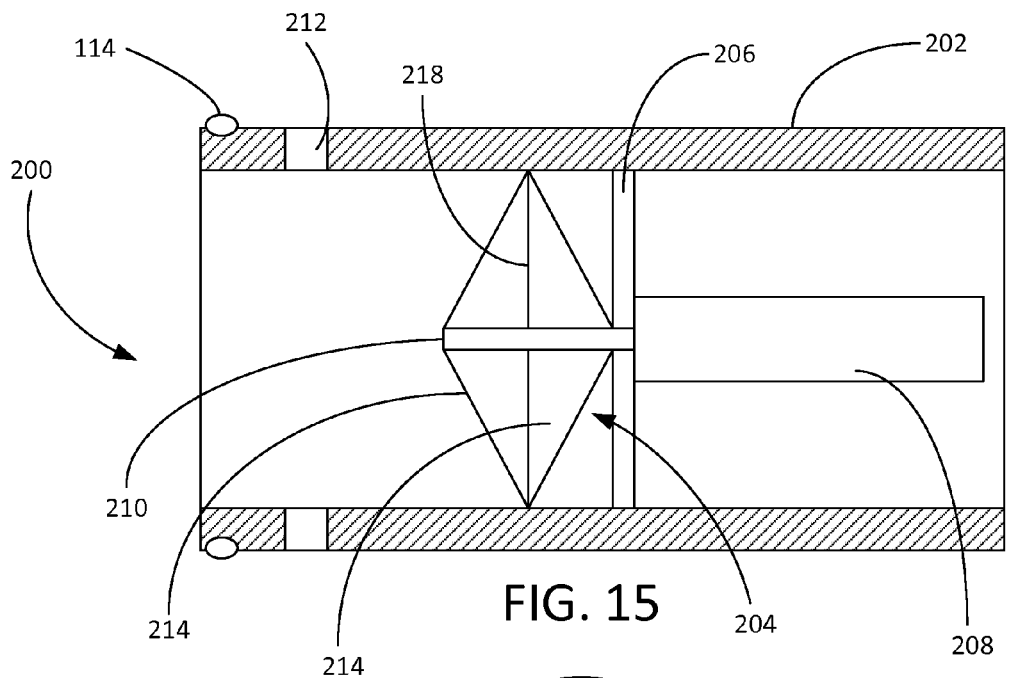
FIG. 15 provides a side cross-sectional view of the throttle control module with an umbrella bladder in a first position.
Figure 16:
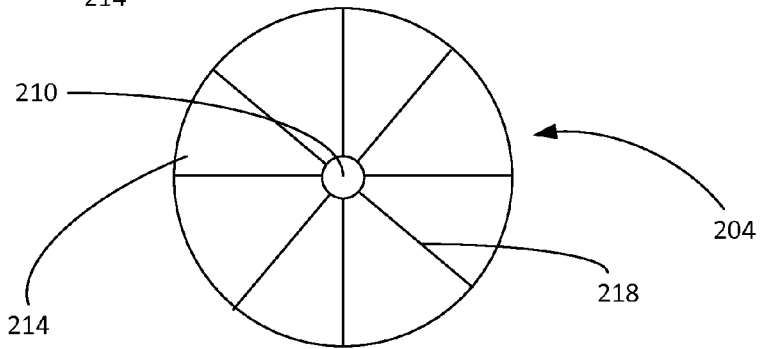
FIG. 16 provides a downstream view of the umbrella bladder of FIG. 15.
Figure 17:
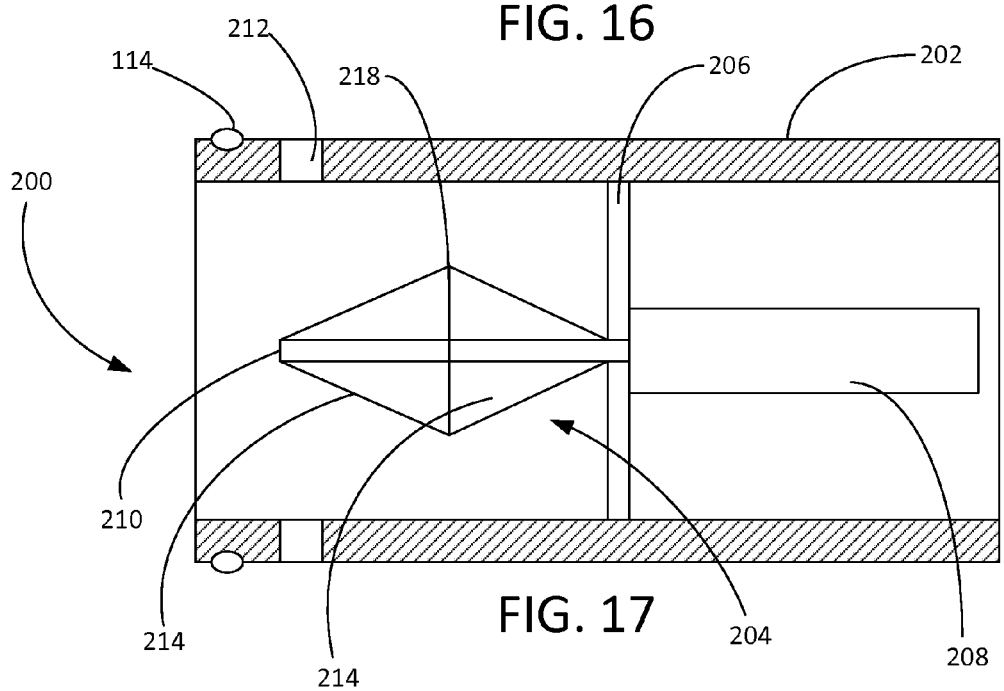
FIG. 17 provides a cross-sectional view of the throttle control module with the umbrella bladder in a second position.

Turning to FIGS. 15-17, shown therein is the optional throttle control module 200. The throttle control module 200 includes a cylindrical housing 202 that is preferably substantially the same diameter of the body 108 of the generator 102. The throttle control module 200 is preferably secured to the upstream side of the generator 102.

The throttle control module 200 further includes an umbrella bladder 204, a throttle strut 206, a hydraulic cylinder 208, a hydraulic piston 210 and one or more exhaust ports 212. The throttle strut 206 extends across the housing 202 and centers the hydraulic piston 210, hydraulic cylinder 208 and umbrella bladder 204 within the housing 202. The throttle control module 200 preferably includes a plurality of flow sensors 114 positioned on the upstream portion of the housing 202. The flow sensors 114 are configured to measure flow entering the throttle control module 200 on a differential basis around the circumference of the throttle control module 200 and to separately output signals to the onboard computer 116 representative of the measured flow.

The umbrella bladder 204 includes an upstream face 214, a downstream face 216 and braces 218. The upstream face 214 and downstream face 216 are preferably manufactured from a durable, flexible material supported by metal braces 218. Suitable materials of manufacture include polymers, wear-resistant and waterproof fabrics, and thin metal foils. The upstream face 214 and downstream face 216 are connected by hinged or jointed connections around the periphery of each face 214, 216. The upstream face 214 and downstream 216 are also connected by hinged or jointed connections at the center of each face. This permits the upstream face 214 and downstream face 216 to elongate into an open position (FIG. 17) or retract into a closed position (FIG. 15).

The movement and position of the umbrella bladder 204 is controlled by movement of the piston 210. The upstream face 214 is secured to the distal end of the piston 210 and the downstream face 216 is secured to the throttle strut 206. As the piston 210 deploys, it carries the center of the upstream face 214 away from the downstream face 216, thereby reducing the diameter of the umbrella bladder 204. As the piston 210 retracts, the upstream face 214 is brought together with the downstream face 216 to increase the diameter of the umbrella bladder 204. Thus, but controlling the position of the piston 210, the umbrella bladder 204 can be made to obstruct or permit the flow of fluid through the throttle control module 200. In particularly preferred embodiments, the operation of the throttle control module 200 is controlled by the onboard computer 216 to optimize the production from the generator 102.

It will be understood that preferred embodiments include the use of the throttle control module 200 alone or in connection with the variable pitch-turbines 184. Similarly, it may be desirable to employ the variable-pitch turbines 184 with or without the use of the throttle control module 200. For example, in applications in which the local environment is well-known and nominally variable, the use of variable-pitch turbines 184 and the throttle control module 200 may be unnecessary. In situations where the local environment is well-known, but at least moderately variable, it may be desirable to use only the variable-pitch turbines 184. In cases where the installation environment is unknown and potentially variable, it is recommended that the generator system 100 include both variable-pitch turbines 184 and the throttle control module 200.

It is clear that the present invention is well adapted to carry out its objectives and attain the ends and advantages mentioned above as well as those inherent therein. While presently preferred embodiments of the invention have been described in varying detail for purposes of disclosure, it will be understood that numerous changes may be made which will readily suggest themselves to those skilled in the art and which are encompassed within the spirit of the invention disclosed herein.

It is claimed:

1. A fluid-driven electricity generator comprising:
   a stator assembly; wherein the stator assembly comprises:
      a stator core that includes a plurality of stator windings; and
      one or more stator turbines connected to the stator core, wherein the one or more stator turbines are configured to rotate in a first direction;
   a rotor assembly, wherein the rotor assembly comprises:
      a plurality of permanent magnets, wherein the plurality of permanent magnets are substantially surrounded by the stator core; and
      one or more rotor turbines connected to the plurality of permanent magnets, wherein the one or more rotor turbines are configured to rotate in a second direction that is opposite the first direction; and
   a throttle control module, wherein the throttle control module comprises:
      a housing; and
      an umbrella bladder that is configured to elongate and retract within the housing.

2. The generator of claim 1, wherein the generator further comprises a body that includes at least one buoyancy chamber.

3. The generator of claim 2, wherein the buoyancy chamber has a fixed volume of fluid.

4. The generator of claim 1, wherein the generator further comprises:
   a body;
   dorsal fins; and
   lateral fins.

5. The generator of claim 4, wherein the dorsal and lateral fins are adjustable.

6. The generator of claim 1, wherein the one or more rotor turbines are variable-pitch turbines.

7. The generator of claim 6, wherein the one or more stator turbines are variable-pitch turbines.

8. The generator of claim 1, wherein the umbrella bladder comprises an upstream face, a downstream face and a plurality of braces.

9. The generator of claim 8, wherein the throttle control module further comprises a hydraulic piston connected to the upstream face.

10. The generator of claim 9, further comprising:
    an umbilical, wherein the umbilical connects the generator to a power facility; and
    an onboard computer, wherein the onboard computer is configured to control the operation and orientation of the generator.

11. An underwater electric generator system comprising:
    an electric generator, wherein the electric generator is buoyant;
    a power facility;
    an umbilical connecting the generator to the power facility; and
    a throttle control module that comprises:
       a housing; and
       an umbrella bladder that is configured to elongate and retract within the housing.

12. The generator system of claim 11, wherein the generator comprises:
    a stator assembly; wherein the stator assembly comprises:
       a stator core that includes a plurality of stator windings; and
       one or more stator turbines connected to the stator core, wherein the one or more stator turbines are configured to rotate in a first direction;
    a rotor assembly, wherein the rotor assembly comprises:
       a plurality of permanent magnets, wherein the plurality of permanent magnets are substantially surrounded by the stator core; and
       one or more rotor turbines connected to the plurality of permanent magnets, wherein the one or more rotor turbines are configured to rotate in a second direction that is opposite the first direction.

13. The generator system of claim 12, wherein the generator further comprises a body that includes at least one buoyancy chamber that includes a fixed volume of fluid.

14. The generator system of claim 13, wherein the generator further comprises:
    a body;
    dorsal fins; and
    lateral fins.

15. The generator system of claim 14, wherein the one or more rotor turbines and one or more stator turbines are variable-pitch turbines.

16. The generator system of claim 11, wherein the generator further comprises an onboard computer, wherein the onboard computer is configured to control the operation and orientation of the generator.

17. The generator system of claim 16, wherein the onboard computer is configured to control the dorsal fins, the lateral fins and the throttle control module.

18. A fluid driven generator:
    a stator assembly; wherein the stator assembly comprises:
       a stator core that includes a plurality of stator windings; and one or more stator turbines connected to the stator core, wherein the one or more stator turbines are configured to rotate in a first direction;

a rotor assembly, wherein the rotor assembly comprises:
   a plurality of permanent magnets, wherein the plurality of permanent magnets are substantially surrounded by the stator core; and
   one or more rotor turbines connected to the plurality of permanent magnets, wherein the one or more rotor turbines are configured to rotate in a second direction that is opposite the first direction;

an onboard computer; and a throttle control module that comprises:
   a housing; and
   an umbrella bladder that is configured to elongate and retract within the housing, wherein the position of the umbrella bladder is controlled by the onboard computer.

19. The electric generator of claim 18, wherein the electric generator further comprises:
   a body;
   dorsal fins attached to the body, wherein the dorsal fins are configured to adjust the yaw of the generator body;
   lateral fins attached to the body, wherein the lateral fins are configured to adjust the pitch and roll of the generator body; and
   wherein the dorsal fins and lateral fins are controlled by the onboard computer.

* * * * *